Dec. 2, 1952     E. H. DILLEY ET AL     2,620,142
ANTIBACKLASH ATTACHMENT FOR FISHING REELS
Filed June 20, 1950     2 SHEETS—SHEET 1
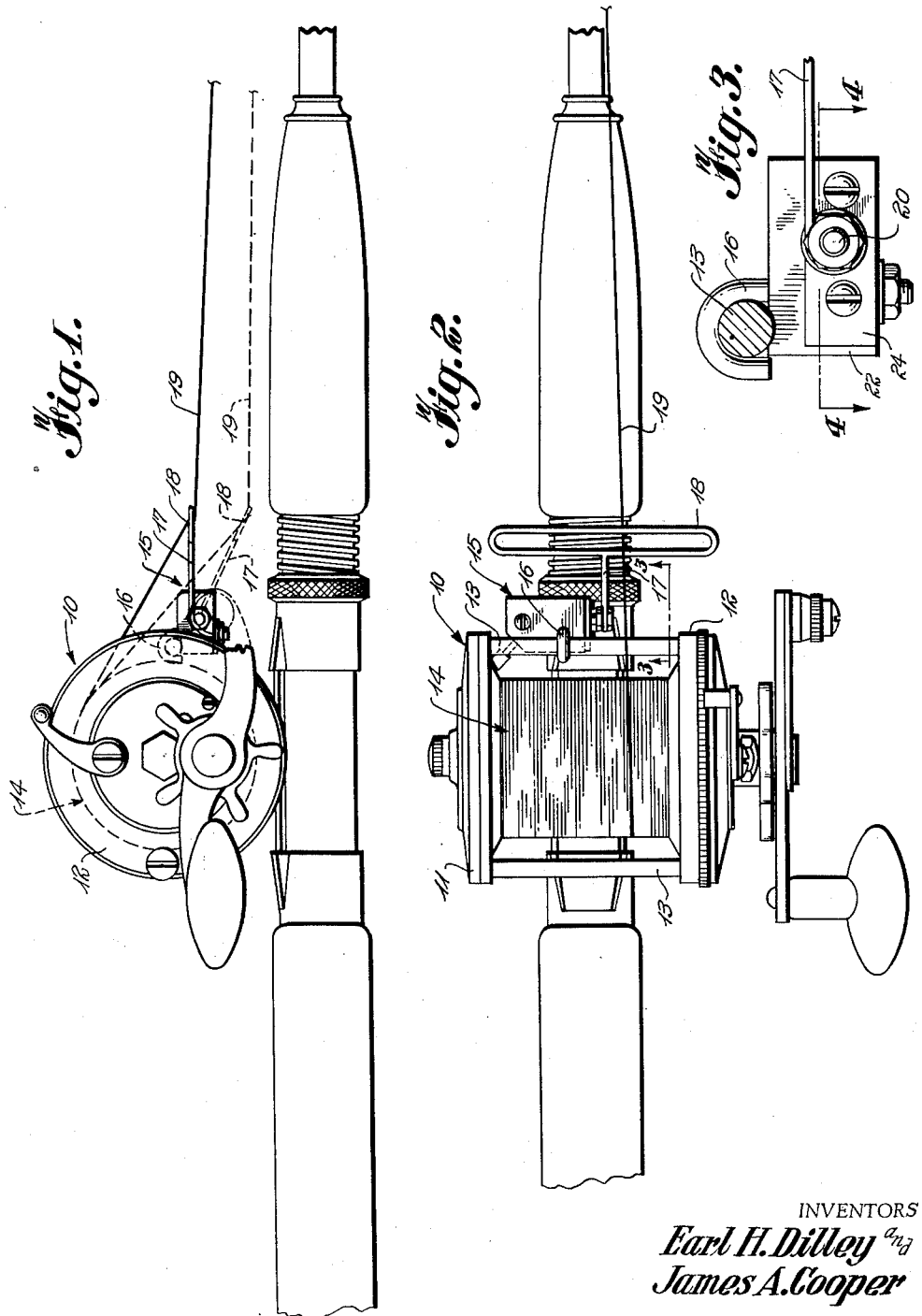
INVENTORS
*Earl H. Dilley* and
*James A. Cooper*
BY
*Edwin B. Gary*
ATTORNEY Dec. 2, 1952 E. H. DILLEY ET AL 2,620,142
ANTIBACKLASH ATTACHMENT FOR FISHING REELS
Filed June 20, 1950 2 SHEETS—SHEET 2
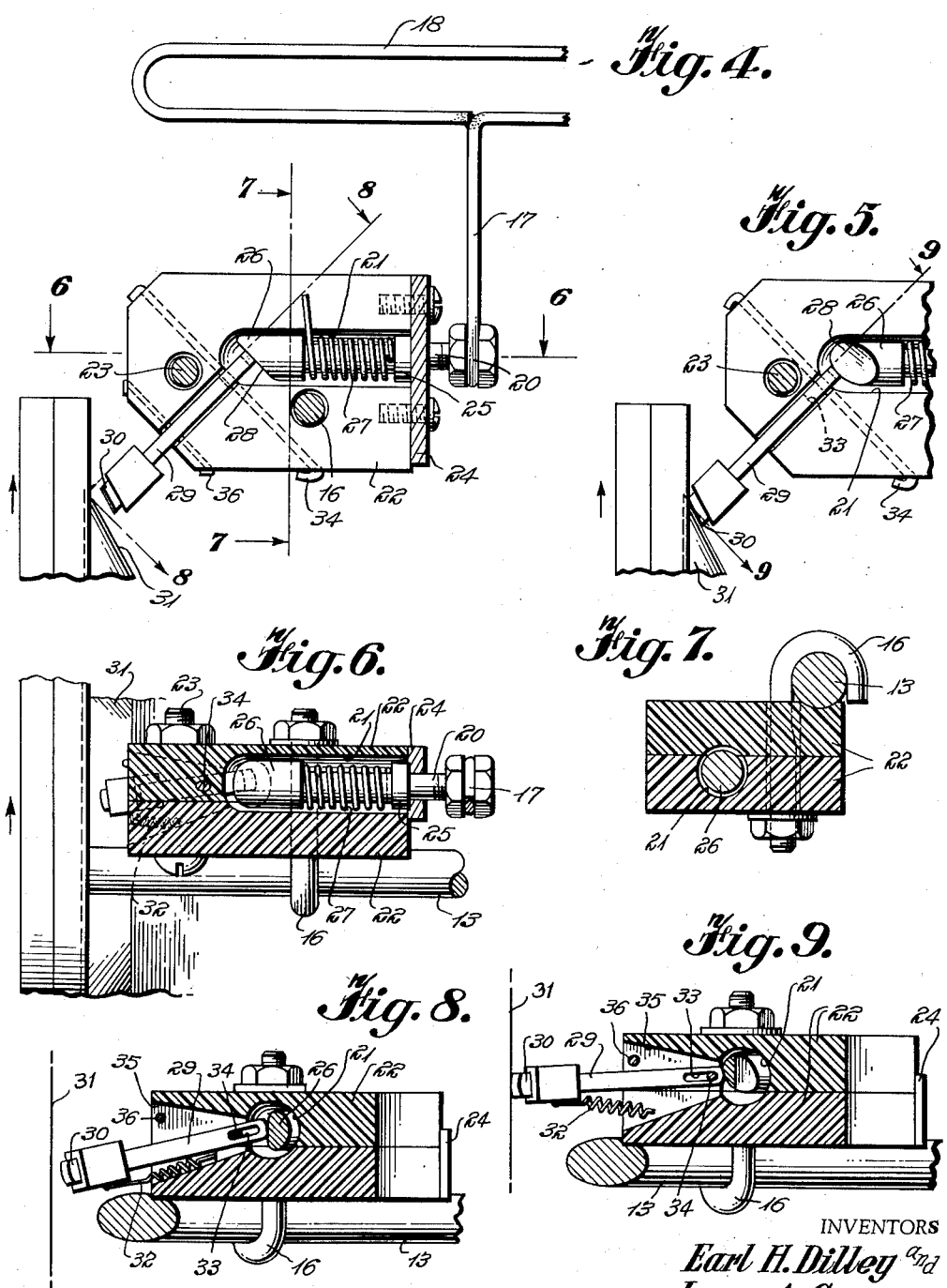
INVENTORS
Earl H. Dilley and
James A. Cooper
BY
Edwin B. Gary
ATTORNEY Patented Dec. 2, 1952

2,620,142

UNITED STATES PATENT OFFICE 2,620,142

ANTIBACKLASH ATTACHMENT FOR FISHING REELS

Earl H. Dilley, Washington, D. C., and James A. Cooper, Arlington, Va.

Application June 20, 1950, Serial No. 169,194

3 Claims. (Cl. 242—84.5)

This invention relates to a device for preventing overrunning of a reel when paying out a line carried by the reel, and more particularly the invention is concerned with a device of the character described wherein the reel is controlled by a brake which automatically responds to, and in accordance with, the tension on, or slack in, the line.

The principal object of the invention is to provide a device which is so designed that the brake will be controlled in such a manner that free paying out of the line will be insured when the line is under the proper tension.

A further object is to provide a device having a brake which is highly sensitive, self-energizing and which will not retard to any material degree paying out of the line when the latter is under the proper tension.

A still further object is to provide a device which may be employed as an attachment and which, when so employed, may be applied to standard reels without the necessity of modifying the latter to accommodate the device.

A still further object is a novel design and arrangement of the parts of the device, whereby to provide for simplicity and economy in construction.

The invention is illustrated in the accompanying drawings, wherein;

Figure 1 is a side elevational view of a fishing rod and reel, a device embodying the features of the invention being applied to the latter as an attachment;

Figure 2 is a top plan view;

Figure 3 is an enlarged fragmentary section taken along line 3—3 of Figure 2;

Figure 4 is a sectional view taken along line 4—4 of Figure 3, the brake being shown in a released position;

Figure 5 is a similar view (fragmentary), the brake being shown in the applied position;

Figure 6 is a section taken along line 6—6 of Figure 4;

Figure 7 is a section taken along line 7—7 of the same figure;

Figure 8 is a section taken along line 8—8 of Figure 4; and

Figure 9 is a section taken along line 9—9 of Figure 5.

The invention is characterized by features which adapt it particularly, although not necessarily, for use in connection with fishing reels, being operative, when so employed, to act automatically upon the reel spool to prevent back-lash when casting.

The device is illustrated and described, therefore, by way of example in connection with a conventional fishing reel 10. The frame of the latter includes the usual end walls 11 and 12 which are connected by posts 13, the reel spool being indicated at 14. In the drawings, the device, indicated at 15, is illustrated as an attachment and as being mounted upon one of the posts 13 by a bolt 16, the latter having a hooked end which engages over said post.

The device 15, as best shown in Figures 1 and 2, includes an actuating lever 17, the outer end of which is formed, or provided, with an elongated, transversely-extending, eye 18. The line 19 which is carried by the reel spool 14 is threaded through the said eye, the line 19 being illustrated under sufficient tension in Figures 1 and 2 to hold the actuating lever 17 in a position in which the brake is released so that free running of the reel spool will be permitted. The actuating lever 17 is illustrated in dotted lines in these figures in the position corresponding to the applied position of the brake, the actuating lever automatically assuming the latter position when the line 19 becomes slack.

Referring to Figure 4, wherein the actuating lever 17 is shown in the release position, it will be noted that the said lever is mounted on the outer end of a shaft 20. The latter is located in a chamber 21 which is formed in adjacent faces of cooperating plates 22 which are secured together by the bolt 16 and a bolt 23 and which carry an end plate 24 through which the shaft 20 passes to enter the chamber 21.

The shaft 20 which is journaled in the plate 24 carries a collar 25 which limits outward axial movement of the said shaft. At its inner end, the shaft 20 carries a cam 26 and between the collar 25 and the cam 26 it carries a coil spring 27, one end of the latter being suitably secured to the plates 22 and the other end being secured to the shaft 20. The spring 27 is under initial tension and is operative to normally hold the shaft 20 in the angular position shown in Figure 5. In this position of the shaft 20, the beveled end 28 of the cam 26 acts against the inner end of a stem 29 to move the latter lengthwise outwardly and in so doing cause a shoe 30 carried by the outer end of the stem to engage a side wall 31 of the reel spool 14. In this position of the stem 29, the brake is applied to resist turning movements of the reel spool, this position of the stem 29 corresponding to the dotted-line position of the actuating lever 17, as shown in Figure 1.

When the line 19 is being payed out, as shown in full-lines in Figure 1, the tension of the line is operative to swing the actuating lever 17 to the full-line position shown in this figure and hold it in such position so long as the line remains under tension. As the lever 17 is moved to such position by the line 19 and against the action of spring 27, the beveled end 28 of the cam is moved to the position shown in Figure 4, thereby permitting a spring 32 (Figure 8) to retract the shoe 30 to the inoperative position shown in Figure 4. One end of the spring 32 is connected to the shoe 30. The other end is connected to the plates 22 by bolt 23. In this connection, it will be noted that the inner end of the stem 29 is slotted as at 33 to accommodate a connecting pin 34 which is carried by one of the plates 22. The slotted connection described permits outward and retractory movements of the brake shoe in the manner described.

In accordance with the invention, the brake is self-energizing in operation. To this end, the stem 29 is mounted so that not only may it be extended and retracted but it may also swing on the pin 34. Referring in this connection to Figures 8 and 9, it will be noted that the plates 22 are formed with an outwardly-flaring passage 35 which communicates with the chamber 21 and in which the stem 29 may swing on the pin 34.

Figure 8 shows the "off" position of the brake, this figure corresponding, therefore, to Figure 4. In the "off" position of the brake (the line being payed out under the proper tension), the stem 29 is not only held retracted by the spring 32 but, as shown in Figure 8, is also swung to the rear limit of its range of movement. When slack starts to accumulate in the line and the actuating lever 17 is released and moves toward its normal position in response to the spring 27, the cam 26 will be operative to move the stem 29 lengthwise and cause the brake shoe to engage the side wall of the reel spool. However, when the brake shoe engages the side wall of the reel spool, it will be urged by the spool in the same direction the spool is turning, pivoting on stem 29 as it does this. In other words it will try to follow the spool, thereby wedging the braking element between the side wall of the reel spool and the cam. Figure 9 shows the manner in which the brake element has been carried toward the opposite side of the passage 35 by the engagement between the brake shoe and the reel spool. Preferably, a pin 36 which is carried by one of the plates 22 serves as a stop to limit swinging movement of the stem 29. A self-energizing braking action is obtained by the construction described. As a result, the desired braking action on the reel spool may be obtained by a light spring action. This is highly desirable as such spring action must be overcome by the tension in the line. A light spring action has the advantage, therefore, that a minimum amount of energy is taken out of the line by the brake.

From the foregoing, it will be apparent that the device has the advantage that it is operative to permit free paying out of the line on the reel spool but is automatically operative to exercise a braking action on the reel spool in the event that the latter starts to overrun the line. The spring which is employed to bias the brake shoe toward the reel spool need only be strong enough to insure engagement between the two as the major portion of the braking obtained is a result of the self-energizing action of the device.

The device has been illustrated and described in connection with a fishing reel. It is to be understood, however, that this is intended by way of example only and that the advantages of the invention may be obtained in connection with various other environments wherein a reel is employed and wherein it is desirable that the reel spool not overrun the line while the latter is being payed out.

We claim as our invention:

1. A device for preventing overrunning of a reel from which a line is to be payed out, comprising a support mountable on the reel, a shaft oscillatably mounted on said support, a lever secured at one end to said shaft and having a free end formed with an eye through which said line is threaded so that said shaft moves in response to variations in tension of said line, a brake element, a cam connected to said shaft and engaging said brake element, resilient means constantly urging said shaft in one direction about its axis to cause said cam normally to assume an angular position in which said brake element is extended to reel-engaging position, resilient means normally holding said brake element in retracted position, said brake element having a slot therein, and a pin engaging said slot to limit movement in opposite directions of said brake element, said pin serving also as a pivot upon which said brake element rocks when it has been moved into engagement with the reel whereby it may be wedged between said reel and said cam.

2. A device for use with a reel, that has a conical surface coaxial with its axis of rotation, for preventing overrunning of a line being payed out from said reel, said device comprising a support mountable on the reel, a shaft oscillatably mounted in said support, a lever arm secured at one end to said shaft and having a free end formed with an eye through which said line is threaded so that said shaft moves in response to variations in tension of said line, a rectilinearly and pivotally movable brake element mounted on said support, a cam carried by said shaft and engaging said brake element, resilient means constantly urging said shaft in one direction about its axis to cause said cam normally to move said brake element into engagement with the conical surface of said reel, resilient means normally holding said brake element in retracted position, said brake element having a slot therein, and a pin engaging said slot to limit movement in opposite directions of said brake element, said pin serving also as a pivot upon which said brake element rocks when it has been moved into engagement with said conical surface whereby it may be wedged between said conical surface and said cam.

3. A device for use with a reel, that has a conical surface coaxial with its axis of rotation, for preventing overrunning of a line being payed out from said reel, said device comprising a support mountable on the reel, a shaft parallel to the axis of said reel, a lever arm secured at one end to said shaft and having a free end formed with an eye through which said line is threaded so that said shaft moves in response to variations in tension of said line, a rectilinearly and pivotally movable brake element mounted on said support, said shaft having at one end a plane surface inclined to the axis of said shaft and which engages one end of said brake element, a shoe carried at the opposite end of said brake element and adapted to engage the conical surface of said reel, resilient means constantly urging said shaft in one direction about its axis to cause said plane surface normally to move the shoe of said brake element into engagement with said conical surface, resilient means normally holding said brake element in retracted position, said brake element having a slot therein, and a pin engaging said slot to limit movement in opposite directions of said brake element, said pin serving also as a pivot upon which said brake element rocks when it has been moved into engagement with said conical surface whereby said shoe may follow and wedge against said conical surface.

EARL H. DILLEY.
JAMES A. COOPER.

REFERENCES CITED

The following references are of record in the file of this patent:

UNITED STATES PATENTS

| Number | Name | Date |
| --- | --- | --- |
| 1,807,433 | Pflueger | May 26, 1931 |
| 2,326,645 | Hill | Aug. 10, 1943 |
| 2,528,926 | Von Pein | Nov. 7, 1950 |
| 2,547,282 | Plouff | Apr. 3, 1951 |

FOREIGN PATENTS

| Number | Country | Date |
| --- | --- | --- |
| 25,100 | Great Britain | of 1904 |
| 151,733 | Great Britain | Sept. 30, 1920 |
| 607,679 | France | Apr. 3, 1926 |